United States Patent [19]
Ishiguro

[11] 4,358,191
[45] Nov. 9, 1982

[54] EXPOSURE RATE CONTROLLING MECHANISM FOR CAMERA

[75] Inventor: Yasuo Ishiguro, Tokyo, Japan

[73] Assignees: Konishiroku Photo Industry Co., Ltd.; Kabushiki Kaisha Copal, both of Tokyo, Japan

[21] Appl. No.: 293,206

[22] PCT Filed: Dec. 19, 1980

[86] PCT No.: PCT/JP80/00315
§ 371 Date: Aug. 10, 1981
§ 102(e) Date: Aug. 10, 1981

[87] PCT Pub. No.: WO81/01885
PCT Pub. Date: Jul. 9, 1981

[30] Foreign Application Priority Data
Dec. 20, 1979 [JP] Japan ............................ 54-177221[U]

[51] Int. Cl.³ .......................... G03B 9/02; G03B 7/08
[52] U.S. Cl. ...................................... 354/271; 354/43
[58] Field of Search ......................... 354/270, 271, 43

[56] References Cited
U.S. PATENT DOCUMENTS
3,491,664 1/1970 Ernisse ................................ 354/43
3,864,700 2/1975 Mielke ................................. 354/43

FOREIGN PATENT DOCUMENTS
47-50174 12/1972 Japan ................................. 354/271

Primary Examiner—Donald A. Griffin
Attorney, Agent, or Firm—James E. Nilles

[57] ABSTRACT

An exposure rate controlling mechanism for a camera comprising an iron member controlled to move to more than three attracted/departed positions by an electromagnet and a mechanism for controlling the exposure rate corresponding to the position to which the iron member moves. The mechanism for controlling the exposure rate comprises an exposure rate controlling member which is moved to a position corresponding to the position to which the iron member moves and an exposure rate determining member which is controlled to move by an amount corresponding to the amount of displacement of the exposure rate controlling member.

5 Claims, 2 Drawing Figures

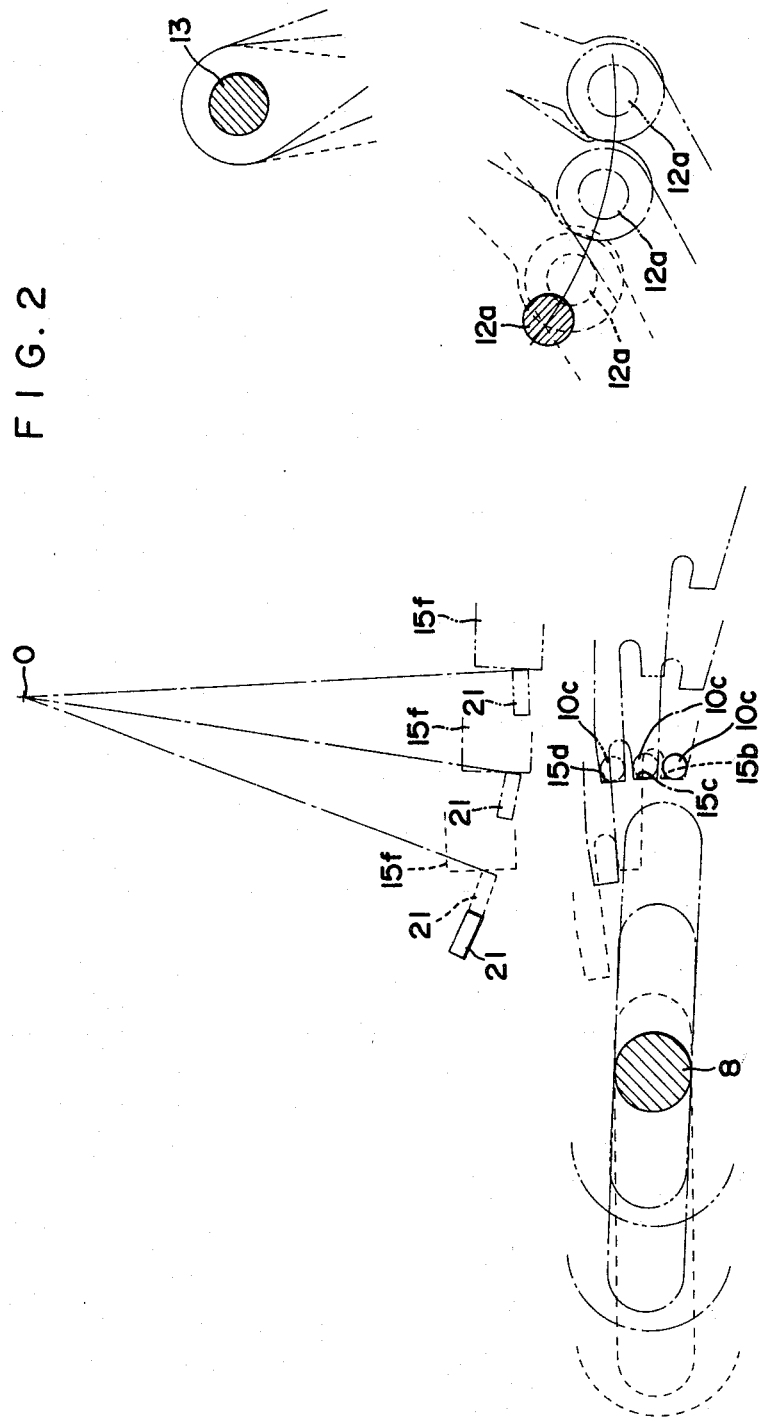

4,358,191

EXPOSURE RATE CONTROLLING MECHANISM FOR CAMERA

DESCRIPTION

1. Technical Field

The present invention relates to an exposure rate controlling mechanism for a camera with a release type electromagnet device.

2. Background Art

There has conventionally been suggested an exposure rate controlling mechanism for a camera with a release type electromagnet device. In such a conventional mechanism, the release type electromagnet device used therein includes a very complicated coupling structure of an iron member and an exposure rate determining member which is controlled to move by an amount determined corresponding to an amount of displacement of the iron member.

The present invention has been suggested to remove such a defect inherent in the conventional exposure rate controlling mechanism for a camera.

DISCLOSURE OF INVENTION

Therefore, it is the object of the present invention to provide an exposure rate controlling mechanism for a camera in which an iron member constituting an exposure rate controlling means and imparted with a repulsive nature against an electromagnet and an exposure rate determining member which is controlled to move by an amount determined corresponding to an amount of displacement of the iron member are coupled to each other organically so that the exposure rate determining member functions to hold pressingly the iron member against the electromagnet.

BRIEF DESCRIPTION OF DRAWINGS

FIG. 2 is an explanatory view fragmentarily showing another operation state of the mechanism shown in FIG. 1.

BEST MODE FOR CARRYING OUT THE INVENTION

Figure 1:
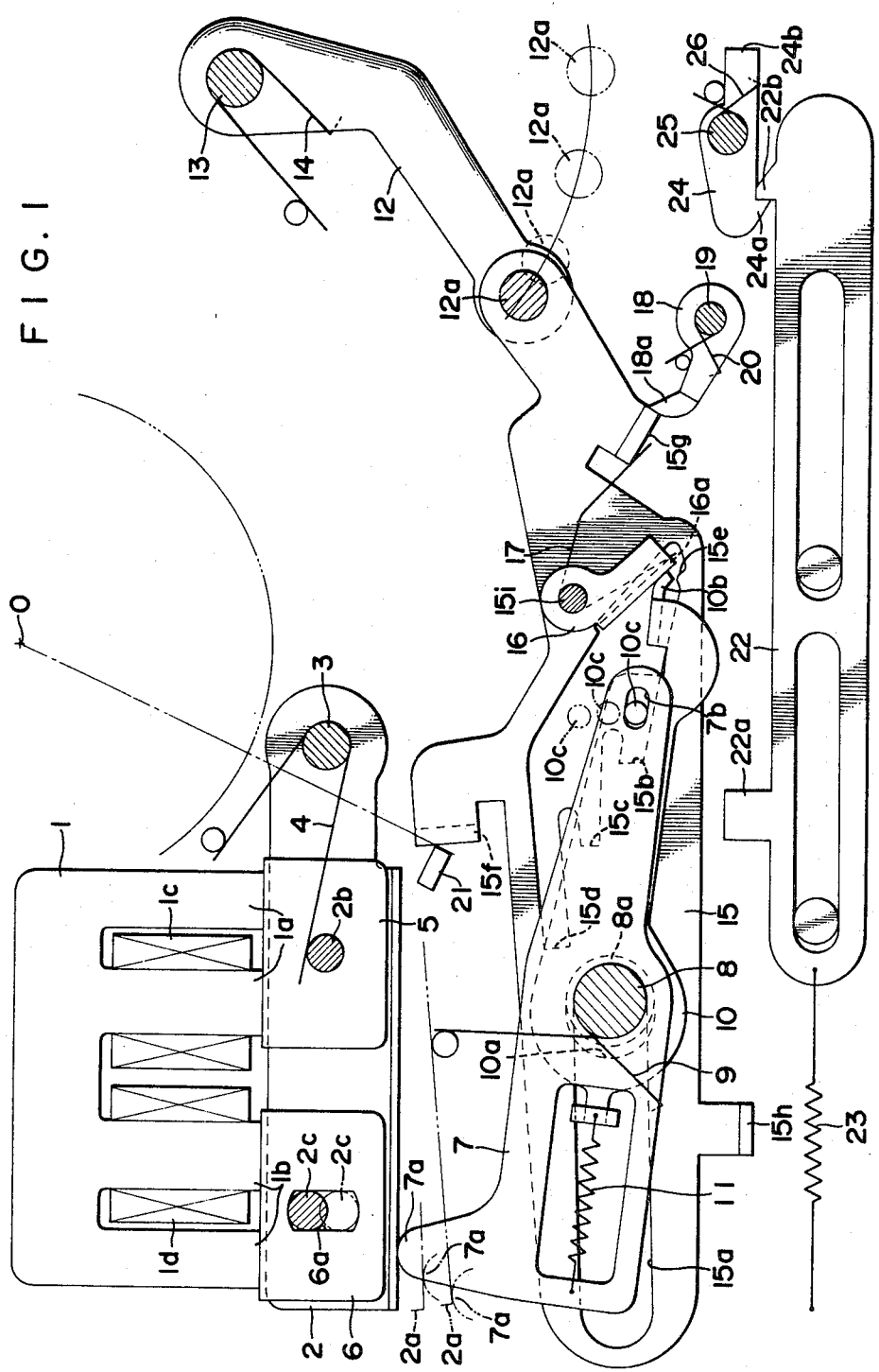
FIG. 1 is an explanatory view showing the set state of an exposure rate controlling mechanism according to an embodiment of the present invention applied as a diaphragm controlling mechanism for a camera.

The present invention will now be described by way of an embodiment in which it is applied as a controlling means of a diaphragm opening degree of a camera with reference to the accompanying drawings.

In the drawings, the numeral 1 denotes an electromagnet in which two pairs of magnetic poles 1a and 1b are wound respectively with two pairs of coils 1c and 1d.

The numeral 2 denotes an iron lever secured to a shaft 3 pivotably and restrained by a spring 4 to rotate in the counterclockwise direction. The iron lever 2 has a bent part 2a and a pair of shafts 2b and 2c planted thereon. The numeral 5 denotes a first iron member pivotably secured to the shaft 2b of the iron lever 2 and forming a counterpart to the magnetic pole 1a of the electromagnet 1. The numeral 6 denotes a second iron member having an elongated groove 6a with which the shaft 2c of the iron lever 2 engages in an idling condition and forming a counterpart to the magnetic pole 1b of the electromagnet 1.

The numeral 7 designates an iron cooperating lever secured to a shaft 8 pivotably and restrained by a weak spring 9 to rotate in the clockwise direction. The iron cooperating lever 7 has a projection 7a through which the lever 7 is brought into contact with the bent part 2a of the iron lever 2. The lever 7 also includes an elongated groove 7b which will be described later. The numeral 10 designates a diaphragm control lever which is engaged in an idling condition with the large diameter part 8a of the shaft 8 through an elongated groove 10a provided therein. The diaphragm control lever 10 has a bent part 10b and a pin 10c planted thereon (this pin 10c extends through the front and back surfaces of the lever 10). The levers 7 and 10 are engaged with each other with the pin 10c of the lever 10 inserted into the elongated groove 7b of the lever 7. A spring 11 is provided between these two levers 7 and 10 so as to pull the diaphragm control lever 10 in the leftward direction in FIG. 1.

The numeral 12 designates a diaphragm operating lever secured pivotably to a shaft 13 and restrained by a spring 14 to rotate in the counterclockwise direction. This lever 12 has a shaft 12a planted thereon. The numeral 15 denotes a diaphragm rate determining lever pivotably secured to the shaft 12a of the diaphragm operating lever 12. This diaphragm rate determining lever 15 includes an elongated groove 15a into which the shaft 8 is inserted in an idling condition, three recessed parts 15b, 15c and 15d engageable with the pin 10c of the diaphragm control lever 10, a stepped part 15e and three bent parts 15f, 15g and 15h. This lever 15 is also planted with a shaft 15i.

The numeral 16 denotes a holding lever which is pivotably secured to the shaft 15i of the diaphragm rate determining lever 15 and restrained by a spring 17 having a force stronger than that of the spring 4 to rotate in the clockwise direction until the rotation is prevented by the stepped part 15e of the lever 15. This holding lever 16 has a bent part 16a which pushes the bent part 10b of the diaphragm control lever 10. The numeral 18 denotes a first engaging lever which is pivotably secured to a shaft 19 and restrained by a spring 20 to rotate in the clockwise direction. This lever 18 is formed with an arm 18a through which the lever 18 is engaged with the bent part 15g of the diaphragm rate determining lever 15. The numeral 21 denotes an operating arm of a diaphragm operating ring not shown which is arranged so as to be rotated in the counterclockwise direction around an optical axis 0 according to the movement of the bent part 15f of the diaphragm rate determining lever 15 on the release operation. The operating arm 21 is then rotated in the clockwise direction by said lever 15 when the latter is set.

The numeral 22 denotes a setting plate which is arranged movably in parallel to the diaphragm rate determining lever 15 and restrained by a spring 23 to move in the leftward direction in the drawing. This setting plate 22 has an arm 22a which pushes the bent part 15h of the lever 15 when the setting plate 22 is moved leftwardly. The setting plate 22 also has a projection 22b, which will be described later.

The numeral 24 denotes a second engaging lever pivotably secured to a shaft 25 and restrained by a spring 26 to rotate in the counterclockwise direction. This second engaging lever 24 engages with the setting plate 22 by means of an engagement of a hook 24a provided in the lever 24 with the projection 22b of the setting plate 22. The second engaging lever 24 is formed with an arm 24b at an end opposite to the hook 24a. When the arm 24b is pushed by the closing operation of the shutter of the camera, the lever 24 makes rotation in the clockwise direction against the tensile force of the spring 26 so that the hook 24a is disengaged from the projection 22b of the setting plate 22.

The setting plate 22 is adapted to be cooperative with the film winding operation in such a manner that at the same time of the shutter setting, the setting plate 22 moves in the rightward direction in the drawing against the tensile force of the spring 23 so that it comes into an engagement with the second engaging lever 24.

It should be noted here that, though the electromagnet 1 and the iron lever 2 are shown in the same plane as the other parts and components for the sake of convenience of easy understanding, they actually stand in the vertical direction with respect to the plane in which other parts and components are arranged. Therefore, an aperture of the camera is not obstructed by the electromagnet 1 and the iron lever 2.

Next, the operation of the exposure rate controlling mechanism thus constructed will be described.

An electrical control circuit is provided for controlling both of the coils 1c and 1d of the electromagnet 1. The electric control circuit is connected to a power source through a switch. When the power source switch is closed, the electric control circuit provides an output for energizing either one of the coils 1c and 1d of energizing neither of these coils based on the information on the brightness in the object field or on the manually preset diaphragm rate.

In this case, the power source switch is closed at the initial stage of the releasing operation. After that, the first engaging lever 18 is operated mechanically or electromagnetically to rotate in the counterclockwise direction against the tensile force of the spring 20 so that the arm 18a thereof disengages from the bent part 15g of the diaphragm rate determining lever 15.

In a first case in which only the coil 1c is energized, the first iron member 5 is drawn and held by the magnetic pole 1a, maintaining the iron lever 2 at a position shown by a solid line. Accordingly, the iron cooperating lever 7 and the diaphragm control lever 10 are also maintained in positions shown by solid lines. As a result of this, the diaphragm rate determining lever 15 having disengaged from the first engaging lever 18 as mentioned above, is drawn by the counterclockwise rotation of the diaphragm operating lever 12 due to the tensile force of the spring 14 to swing around the pivot shaft 12a through the idle engagement between the shaft 8 and the elongated groove 15a and stopped when the pin 10c of the diaphragm control lever 10 comes into the recessed part 15b of the diaphragm rate determining lever 15. Accompanying this movement of the diaphragm rate determining lever 15, the bent part 15f makes displacement, which is followed by the operating arm 21 of the diaphragm operating ring. Thus the opening degree of the iris diaphragm is determined.

In a second case in which only the coil 1d is energized, the diaphragm rate determining lever 15 starts to move toward the counterclockwise direction, causing the bent part 16a of the holding lever 16 to depart from the bent part 10b of the diaphragm control lever 10. Following this departure, the iron lever 2 also rotates owing to the tension of the spring 4 in the counterclockwise direction until the shaft 2c comes into a contact with the opposite side of the elongated groove 6a as shown by a dot-and-dash line in FIG. 1. As a result of this, the iron cooperating lever 7 is pushed against the tension of the spring 9 to displace the pin 10c of the diaphragm control lever 10 to a position indicated by a dot-and-dash line in FIG. 1 and then into an engagement with the recessed part 15c as shown also by a dot-and-dash line in FIG. 2. Thus the opening degree of the iris diaphragm is determined according to the position.

Finally, a third case is taken up in which neither of the coils 1c and 1d are energized. In this case, the iron lever 2 turns in the leftward direction to cause the pin 10c of the diaphragm control lever 10 to displace to a position indicated by a two-dot-and-dash line in FIG. 1 and then come into an engagement with the recessed part 15d as shown by a two-dot-and-dash line in FIG. 2. Thus the diaphragm rate determining lever 15 is stopped, determining the opening degree of the iris diaphragm accordingly.

When the opening degree of the iris diaphragm is determined according to the respective operations as stated in the foregoing, the shutter is operated to open and then close. The second engaging lever 24 is pushed in the arm 24b by the closing movement of the shutter in the clockwise direction against the tensile force of the spring 26, causing the hook 24a to come out of engagement with the projection 22b of the setting plate 22. Consequently, the setting plate 22 moves leftwardly in the drawing owing to the tensile force of the spring 23. In the course of this leftward movement of the setting plate 22, the arm 22a pushes the bent part 15h, thereby turning the diaphragm operating lever 12 in the clockwise direction against the tension of the spring 14. Thus, the diaphragm rate determining lever 15 is moved leftwardly.

When the diaphragm rate determining lever 15 comes to the last stage of the movement, the bent part 15g is brought into engagement with the arm 18a of the second engaging lever 18, returning to the state indicated by a solid line in FIG. 1. Also, accompanying the movement of the diaphragm control lever 15, the bent part 15f returns the operating arm 21 of the diaphragm operating ring not shown to the solid-line position. On the other hand, the bent part 16a of the holding lever 16 pushes the bent part 10b to turn not only the diaphragm control lever 10 but also the iron cooperating lever 7 in the clockwise direction. As a result, the iron members 5 and 6 are returned through the iron lever 2 to a solid-line position where they are respectively in contact with the magnetic poles 1c and 1d of the electromagnet 1.

The setting plate 22, cooperative with the film winding operation, is moved rightwardly against the tension of the spring 23 by the setting of the shutter (this setting of the shutter also returns the second engaging lever 24 to the shown position in FIG. 1) so as to engage with the second engaging lever 24.

The above-mentioned series of movements of the respective parts bring them to their starting positions shown by solid lines in FIG. 1.

The iron cooperating lever 7 and the diaphragm control lever 10 can be variously designed such that they are formed in an integral unit. However, according to the illustrated construction, since the diaphragm control lever 10 is slidable with respect to the iron cooperating lever 7, shocks caused by the collision of the pin 10c of the lever 10 with the recessed part 15b, 15c or 15d of the diaphragm rate determining lever 15 can be effectively absorbed. This results in the reduction of collision noises and vibrations and the quick determination of the opening degree of the diaphragm.

Further, the holding lever can be constituted of a spring only and may be adapted to act on the iron cooperating lever 7 directly.

In the illustrated embodiment, the electromagnet 1 is formed in an integral unit. However, the electromagnet construction is not limited to the shown one but may be constituted of a plurality of separated sections. In such a multisectional construction, the number of the magnetic poles and coils of the electromagnet 1 can be increased as desired. If the number of iron members 6 is also increased correspondently and the respective iron members have differently-sized elongated grooves, the amount of displacement of the iron lever 2 can be varied according to the same number of stages as the iron members 6.

In this instance, it is natural that the diaphragm rate determining lever 15 is formed with an increased number of recessed parts each for receiving the pin 10c of the diaphragm control lever 10 corresponding to the energized state of the coils.

Further, the electromagnet device can comprise a combination of the electromagnet 1, a pair of iron members 5 and 6 and a permanent magnet. In this construction, the energization of the coil 1c and/or the coil 1d overcomes the magnetic force of the permanent magnet attracting the iron lever 2 at a predetermined position. Thus the iron lever 2 is displaced to three positions corresponding to whether both of the coils 1c and 1d, only one coil 1c or neither of the coils 1c and 1d are energized.

If a pulse is used for actuating the coils, the actuation timing is so set that the actuation starts immediately after the diaphragm rate determining lever 15 starts moving to lose its holding function of the iron lever 2.

It is also possible to modify the engagement structure between the pin 10c of the diaphragm control lever 10 and the recessed parts 15b to 15d of the diaphragm rate determining lever 15 such that the lefthand end surface of the bent part 10b is utilized instead of the pin 10c. In this case, the pin 10c is only inserted loosely into the elongated groove 7b of the iron cooperating lever 7.

Further, the diaphragm rate determining lever 15 can be provided with an exposure period determining function. In this case, the amount of displacement of the bent part 15f is used for determining the length of the exposure period. Also, the lever 15 can work as a member determining both of the exposure time period of such as a programme shutter and the opening degree of the diaphragm.

Industrial Applicability

As described in the foregoing, according to the exposure rate controlling mechanism of the present invention which employs a release type electromagnet device as a controlling means, since the exposure rate determining member is imparted with a function for holding pressingly the iron member against the electromagnet, both of the members are coupled organically, thereby simplifying the entire construction remarkably.

I claim:

1. An exposure rate controlling mechanism for a camera comprising: an electromagnet; means for energizing said electromagnet to any one of a plurality of magnetic levels corresponding to the brightness of the object field of the camera; a magnetizable member 5, 6 having a repulsive nature against said electromagnet 1 and controlled to move from a fully attracted position to a plurality of departed positions depending on the magnetic level of said electromagnet; an exposure rate controlling member 7 engageable with said magnetizable member 5, 6 and controlled to be displaced to displaced positions by an amount corresponding to the position to which said magnetizable member 5, 6 moves, and an exposure rate determining member 15 connected to said exposure rate controlling member 7 and being engageable therewith in one position in a set state and in different positions corresponding to displaced positions of said exposure rate controlling member 7, said exposure rate controlling member pressing said magnetizable member 5, 6 to its fully attracted position in the set state and releasing the pressing in a released state in which said exposure rate determining member 15 is able to move, said move being controlled to stop said exposure rate determining member in a position corresponding to the displaced position of said exposure rate controlling member 7.

2. In an exposure rate controlling mechanism for a camera wherein the fixing position of an exposure rate controlling member 7 is determined in correspondence with a plurality of displaced positions of a magnetizable means 5, 6 which can be released from a fully attracted position near an electromagnet 1 to another position corresponding to the brightness of an object field after being fully attracted to the electromagnet 1, so that the exposure rate is controlled, the improvement in which an exposure rate determining member 15 is provided and the exposure rate controlling member 7 and the exposure rate determining member 15 are engaged with each other in a set state so that the exposure rate controlling member 7 is held in a position wherein the magnetizable means 5, 6 make press contact with said electromagnet 1; and the exposure rate control member 7 and said exposure rate determining member 15 are engaged with each other at different positions corresponding to the displaced positions of said exposure rate controlling member 7.

3. An exposure rate controlling mechanism for a camera as set forth in claim 1 or 2, wherein said exposure rate determining member 15 comprises a diaphragm rate determining member.

4. An exposure rate controlling mechanism for a camera as set forth in claim 1 or 2, wherein a setting mechanism 22 is further included which brings said exposure rate determining member 15 into a set state when a shutter is operated.

5. An exposure rate controlling mechanism for a camera as set forth in claim 1 or 2, wherein said exposure rate controlling member comprises a cooperating lever 7 contacting said magnetizable member 5, 6 and a control lever 10 connected to said cooperating lever 7 through a spring 11 and having a pin 10c by which the movement halting position of said exposure rate determining member 15 is determined, and a holding lever 16 is further included which is connected at one end to said exposure rate determining member 15 and contacted at the other end with said exposure rate controlling member for restraining constantly said exposure rate controlling member to press on said iron member 5, 6.

* * * * *